United States Patent [19]

Romeo

[11] 4,255,260
[45] Mar. 10, 1981

[54] WASTE DISPOSAL SYSTEM

[76] Inventor: Samuel T. Romeo, 1926 Middleborough Rd., Baltimore, Md. 21221

[21] Appl. No.: 101,831

[22] Filed: Dec. 10, 1979

[51] Int. Cl.³ .......................................... B01D 35/00
[52] U.S. Cl. .............................. 210/121; 159/1 RW; 210/513; 210/532.1; 210/196; 210/259; 210/199; 210/519; 110/238
[58] Field of Search ............... 210/173 SG, 71, 59, 210/519, 513, 195.1, 199, 72, 187, 259, 60, 532, 121, 104, 196; 159/1 RW; 110/238

[56] References Cited

U.S. PATENT DOCUMENTS

| | | | |
|---|---|---|---|
| 1,967,197 | 7/1934 | Besselievre | 210/3 |
| 2,277,718 | 3/1942 | Sanders | 210/2 |
| 3,256,178 | 6/1966 | Teletzke et al. | 210/3 |
| 3,359,200 | 12/1967 | Gitchel et al. | 210/63 |
| 3,864,252 | 2/1975 | Morin et al. | 110/238 |
| 3,887,461 | 6/1975 | Nickerson | 210/71 |
| 4,026,223 | 5/1977 | Robbins | 110/238 |
| 4,044,696 | 8/1977 | Marincek | 159/1 RW |

Primary Examiner—Charles N. Hart
Assistant Examiner—E. Rollins Cross
Attorney, Agent, or Firm—John F. McClellan, Sr.

[57] ABSTRACT

A waste disposal system provides a mixing stage where waste matter is water-charged, the water charged mixture is then steam exploded by being sprayed onto a white hot surface in a chamber with only one outlet where the expansion on vaporization forces the vapor out through a chemical spray stage; next a vertical-filter stage removes and gravitationally drains coarse filtrate and finally a horizontal filter stage treats the vapor in the presence of a counterwash spray of fresh water before the vapor is released into the atmosphere; recirculation of the material filtered and treating materials is provided.

1 Claim, 2 Drawing Figures

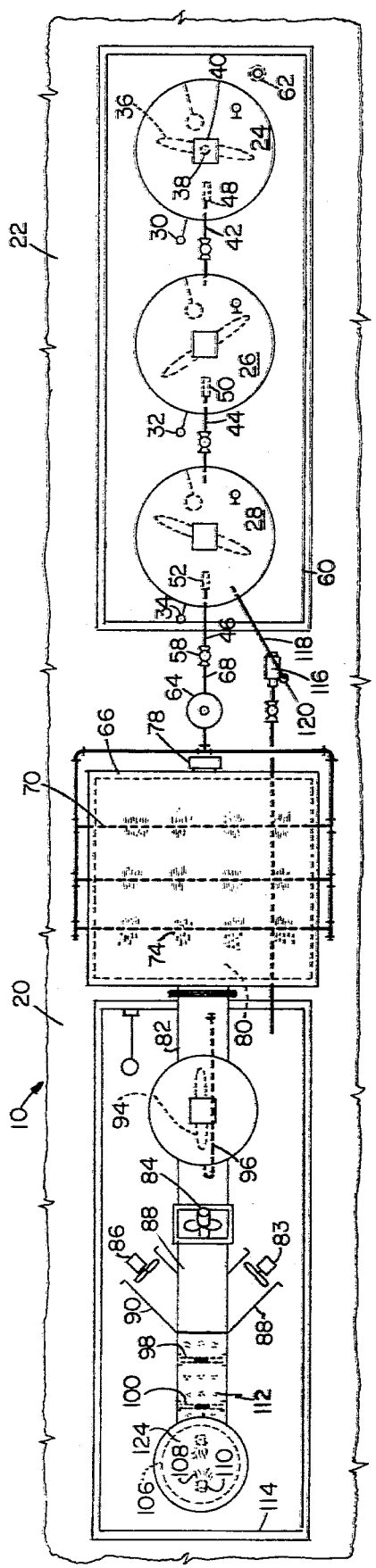
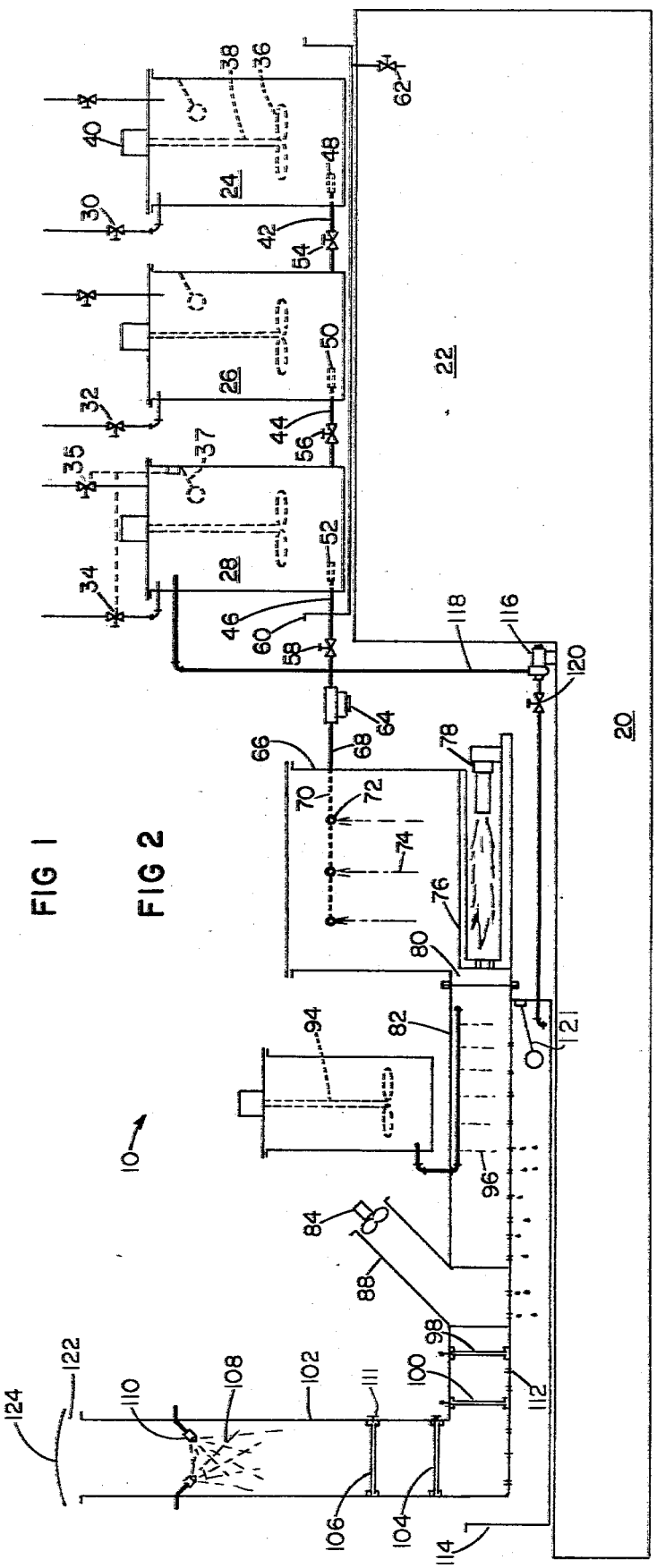
FIG 1
FIG 2

WASTE DISPOSAL SYSTEM

This invention relates generally to waste handling systems and particularly to a system for treating soluble wastes.

Safely dispersing waste accumulations, from sewage to radioactive wastes has become a first priority problem of modern industry. In the prior art on the general subject of waste treatment the following U.S. Patent disclosures are known:

U.S. Pat. No. 1,967,197 deals with sewage sludge and teaches gravity feed, mixing with chemicals, treatings with liquid and with heated air, and incinerating so that only ash is left;

U.S. Pat. No. 2,277,718 deals with packing house sludge and teaches heating and filtering to separate the solids from the liquid;

U.S. Pat. No. 3,256,179 deals with sewage sludge and teaches among other things, aeration of effluent, gravity feed, heating and sludge, recycling effluent, removing a portion as vapor, and filtering;

U.S. Pat. No. 3,359,200 deals with sewage sludge and teaches mixing primary and secondary sources, heating, treating with water and with air and filtering.

However the present invention has proposed a system which is intended according to the objects thereof to treat a wide variety of water-soluble type of wastes with efficiency, to leave a minimum of solid material per pass through the system and to recycle the residue of each pass.

In brief summary given as cursive description only the invention includes in combination means for mixing waste with water, spraying the mixture onto a hot sheet for instantaneously steam-exploding the individual sprayed droplets and vaporizing them, means for passing the vaporized mixture through a chemical spray bath, means for filtering the chemically treated vapor mixture against the flow of a water spray into the atmosphere, and means for returning and recycling solid and excess liquid material from the filtering through the system together with residue of the chemical spray.

The above and other objects and advantages of this invention will become more readily understood on examination of the following description, including the drawings in which like reference numeral refer to like parts:

FIG. 1 is a plan diagram partially in section, of apparatus of the invention; and FIG. 2 is a side elevational diagram, partially in section, thereof.

FIGS. 1 and 2 show in corresponding plan and elevational views the apparatus 10 of this invention in a preferred mode.

The entire system preferably rests on a concrete pad 20 with an upward step 22 at the input end. Operation is continuous, preferably, although batches can be processed.

Waste material of any water-soluble type, as for example a type in which radioactive solid matter is dissociable from a liquid component, or a type in which organic waste is soluble in water, is pumped into the system at the upper level, as from a gravity drain tank above but not shown.

The waste material can be liquid or powder or a slurry, and can be introduced into the mixing stage represented by mixing tanks 24, 26 and 28 in series or in parallel relative to the tanks through valves 30, 32, 34. Valves 35 admit water and conventional solenoid operating float cut-offs 37 may control level in the tanks.

Each mixing tank has a mixing system in the form of an agitator blade 36 inside, driven through a shaft 38 by a motor 40 on top and charges the waste with water.

Each mixing tank has an exhaust line 42, 44, 46 at the bottom connecting through respective coarse filters 48, 50, 52 with the tank interiors.

Each exhaust line has a shut-off valve 54, 56, 58. The exhaust are in series, tank 24 into tank 26, tank 26 into tank 28 and tank 28 into the succeeding stage. More than three tanks can be used according to volume required.

A safety catch pan or basin 60 (shown schematically) and having a capacity at least equal to the combined volumes of the mixing tanks, surrounds the bottom of the tanks to assure no external spillage in case of accident. A valve 62 provides for gravity drain of the catch pan.

The succeeding stage is preferably fed by gravity, with or without a pump 64, to the interior of a heat chamber or tank 66 through pipe 68 which has connection with a grid of pipes forming a sprayhead 70. By means of an array of nozzles or openings 72 in the underside, the sprayhead atomizes the water-charged waste by spraying it downward as at 74.

All sprays of atomized matter impinge at the bottom of the heat tank on a white-hot surface which may be a plate 76 heated by a burner 78 or equivalent. The heat expands the charging water, progressively exploding the atomized water-charged waste matter with steam and thoroughly mixing and dispersing it as vapor in the heat tank. Combustion products may add further heat by exhausting at 80 into the system and mixing with the material being treated, and may be purified at the same time. The heat tank is closed except at the open exhaust 80, through which the pressure of the expanding steam forces the vaporized waste into a horizontal duct 82 continuous with the heat tank.

Under the thrust of intake fans 83, 84, 86, downstream of the chamber, which blow air down through respective air ducts 88, 90 at an oblique forward angle into the horizontal duct 82, the vaporized waste is induced to travel along the horizontal duct beneath a tank 92 having a mixing means 94 and containing an appropriate chemical for spraying as at 96 to neutralize or otherwise treat the vapor, and then through a set of vertically oriented filters which drain coarse filtrate gravitationally down the faces thereof, at least two 98, 100, being shown.

An example of treating chemical sprays, soda ash solution may be used for removal of free fatty acids, waxes, mucilagenous materials and phospholipids and calcium hypochlorite as an oxidizing agent for oils, fats and waxes, in accordance with known principles. The fan air can add desirable oxidation.

The horizontal duct continues at a serial, upward turn into a vertical or upright duct 102 where the vapor passes through a set of horizontal filters, at least two of these 104, 106, being shown, against gravity and a heavy counterflow spray wash 108 of downwardly directed fresh water from a source indicated by the nozzles at 110. Handles 111 permit sliding the filters out for cleaning, on the slideways shown.

Materials carried downward out of the vapor along with the fresh water spray and by the chemical spray, and dripping filtrate, pass through openings 112 in the bottom of the horizontal and vertical ducts and into tube 114 which extends along the bottom of these ducts. Pump 116 returns for recycling liquid collected in the tub to one or more of the mixing tanks through appropriate piping 118 and valving 120. A conventional float control 121 may be used to actuate the pump and to prevent overflow.

Purified vapor exhausts upwardly from the system in opening 122 between the upper end of the vertical duct 102 and the baffle capping it.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for waste disposal comprising: means for charging waste with water, means for progressively causing the waste charged with water to explode, including: a chamber, a hot surface in the bottom of the chamber; means for spraying the waste charged with water downward onto the hot surface and explosively vaporizing same; means for spraying the vapor with a chemical treatment; first means for filtering the chemically treated vapor and gravitationally removing any filtrate resulting from same, second means for filtering the chemically treated vapor against a counterflow wash of water and means for exhausting the water-washed vapor into the atmosphere, the means for charging including at least one tank, mixing means in the tank, means for introducing water and waste into the at least one tank, means for recycling said filtrate together with any unused chemical sprayed and water sprayed comprising a trough beneath a portion of said system with opening into the trough, means for pumping from the trough into said at least one tank and means for controlling level of material in said trough, the means for exhausting including a horizontal duct at said chamber and the chamber being substantially closed to outward passage of material therefrom except for an opening into the duct, causing pressure of said vaporizing to move vapor from the chamber, the means for exhausting further including fan means having connection with the duct for forcing air thereinto at an oblique angle away from said chamber, the means for gravitationally removing comprising said first means for filtering being vertically oriented and above said trough; an upward duct having serial connection with said horizontal duct, the second means for filtering the chemically treated vapor against a counterflow of water comprising said second filtering means being horizontally oriented in said upward duct and means above said second means for filtering spraying water downwardly thereonto, said first and second means for filtering having means for sliding for cleaning and replacement, a safety catch-basin beneath said at least one tank having at least the capacity of said at least one tank, and means for controlling the level of waste and water in said at least one tank.

* * * * *